July 7, 1970     A. M. WESTERMAN     3,518,937
NULL PRESSURE HAY BALER PRESSURE PLATE EQUALIZER
Filed Sept. 8, 1967
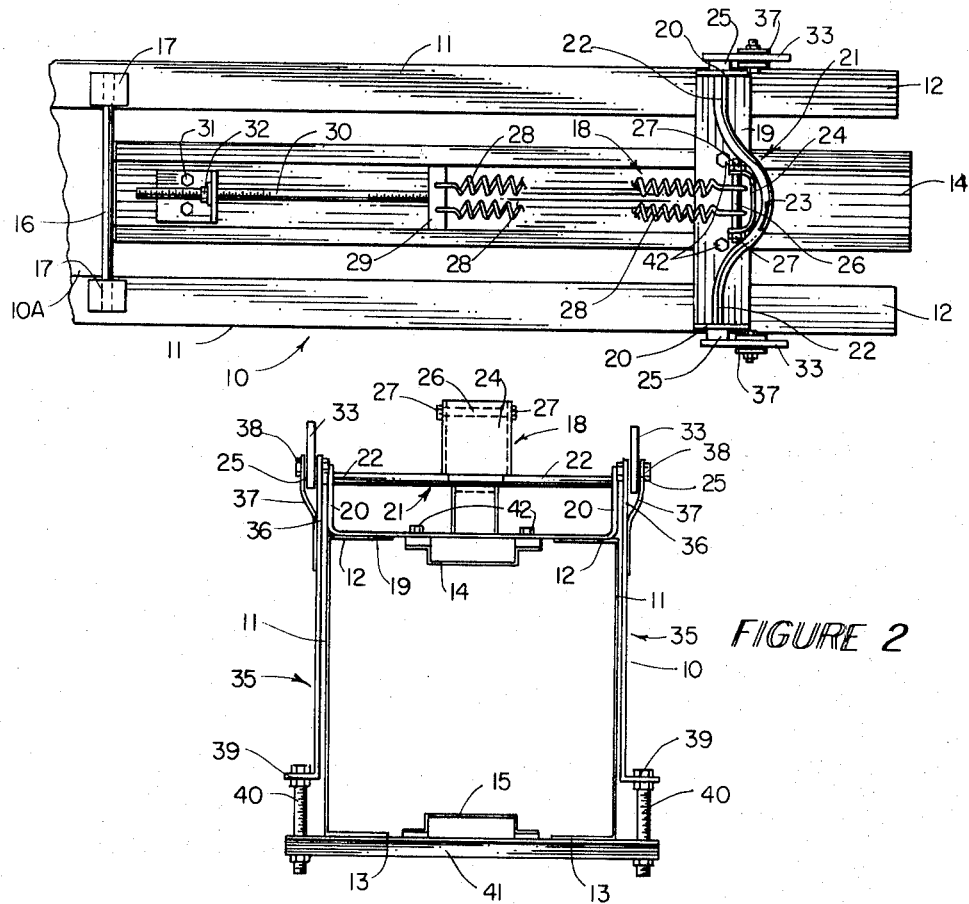
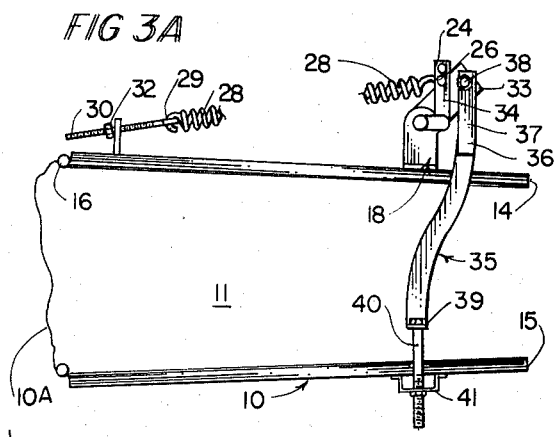
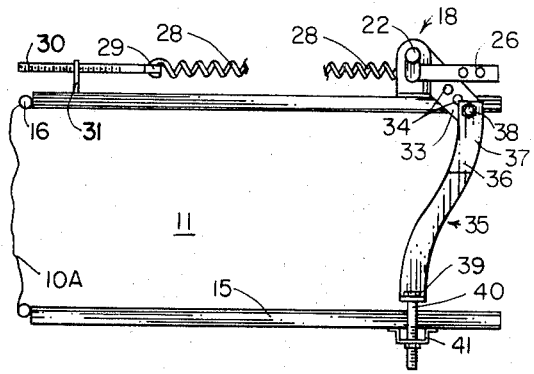
FIGURE 3
Albert M. Westerman, INVENTOR.
BY
ATTORNEY

3,518,937
NULL PRESSURE HAY BALER PRESSURE PLATE EQUALIZER
Albert M. Westerman, E. 10122 Broadway, Spokane, Wash. 99206
Filed Sept. 8, 1967, Ser. No. 666,356
Int. Cl. B30b 1/00
U.S. Cl. 100—192    1 Claim

ABSTRACT OF THE DISCLOSURE

A bell-crank operated tensioning device for a hay baler having relatively moveable opposed pressure plates regulating bale density, with mechanical linkage communicating therebetween to provide pressure between said plates. The bell-crank is mechanically biased to present lessened pressure between the pressure plates upon their extension and greater pressure upon their compression, with substantially no component of pressure between the plates at their outwardmost extension. The pressure-compression function is variable within limits by adjustable positioning of the bell-crank arms and by means of adjustable linkages communicate with the pressure plates.

BACKGROUND OF INVENTION

Field of invention

This invention relates generally to a variable tensioning system for opposed pressure plate hay balers and more particularly to such a tensioning system providing less tension upon expansion with substantially no pressure at greatest extension.

Description of prior art

Many hay balers heretofore known provide for continuous bale formation in a rectilinear chamber having paired opposed pressure plates associated therewith in such fashion that pressure is applied to the bale between the plates to regulate the density and compaction of material therein. Generally, the bale move lineally through the bale chamber during its formation and the bale density is regulated by the time of passage therethrough and thusly in proportion to the amount of friction exerted thereon by the pressure plates; this in turn is functionally related to the force exerted between the pressure plates.

In the operation of such balers the surface frictional characteristics of bales vary with the nature of baled material, particularly in the case of hay, with the nature of the moisture content. As the moisture content increases, the sliding friction between bale and pressure plates increases, oftentimes to such a degree that the baling operation becomes fouled. In response to this problem various resilient mechanical means have become known to join the two pressure plates to allow them to move away from each other in response to the nature and condition of material passing therebetween. Such devices may be divided into a first class providing only a resiliently yieldable mechanical connection between the pressure plates which allows their expansion away from each other in substantially direct proportion to the distance between them and into a second improved class of such devices that in varying functional relationships allows the pressure between pressure plates to lessen relatively as the plates move away from each other.

The instant invention is concerned with an improvement in the latter type of devices such as disclosed by the application of Donald M. Westerman, filed July 19, 1965 under Ser. No. 473,009, now Pat. No. 3,356,017. This type of structure provides a decreasing force between the pressure plates upon their expansion, but there yet remains a pressure between them even at greatest expansion. This type of structure has not been found to be completely satisfactory with wet hay, as the device may plug or choke. The instant invention is distinguished from this prior art in that its particular configuration allows the bell-crank type biasing means to move to a position where there is substantially no pressure between the opposed pressure plates when in the most extended position.

SUMMARY OF INVENTION

The instant invention is adapted for use on the common hay baler of commerce having a rectilinear baling chamber with paired opposed pressure plates pivotably journaled in such fashion as to position the plates along the peripheral surface of the baling chamber to frictionally contact a bale therein as it moves through the chamber.

The invention provides a mechanical linkage communicating between the opposed pressure plates to yieldably urge them toward each other in their contracted positions but yet provide substantially no force therebetween in their fully extended position. This is accomplished by mechanical linkage embodying a bell-crank communicating between the pressure plates, the bell-crank being urged to a first position by a mechanical biasing means with the bell-crank so configured that as its rotary motion changes from the first position the component force existing between the pressure plates decreases as the pressure plates move away from each and this condition continues in varying degrees until the plates come to their maximum distance apart. The bell-crank axle is so configured as to allow the biasing means to move through the pivotable axis thereof so that all force exerted upon the bellcrank is exerted in a plane substantially perpendicular to the normal line joining the pressure plates, and in this condition there is substantially no pressure existing between the plates.

In providing such a structure the principal purposes of my invention are:

To provide a hay baler pressure plate linkage of the nature aforesaid that provides a continuously decreasing pressure between paired opposed pressure plates upon their expansion away from each other with substantially no pressure therebetween at the point of maximum expansion;

To provide a device of the nature aforesaid that is adjustable within limits to allow variation in the pressure plate distance-force function and in the maximum distance at which the force between plates will be zero;

To provide a device of the nature aforesaid that provides for an automatic adjustment of the hay baler pressure plates to accomodate hay of any nature from the most green, moist variety to the most dry, without plugging of the baling chamber;

To provide such a device that is an attachment adapted for use on existing balers of commerce by addition of simple, inexpensive structures and without major modifications thereof;

To provide such a device that is of new and novel design, of simple and economic manufacture, of rugged and durable nature, and one otherwise well adapted to the uses for which it is intended;

Other and further objects of my invention will appear from the following specification and accompanying drawings which form a part of this application. In carrying out the objects of my invention, however, it is to be understood that its essential features are susceptible of changes in design and structural arrangement, with only one preferred and practical embodiment being illustrated in the accompanying drawings, as is required.

BRIEF DESCRIPTION OF DRAWINGS

In the accompanying drawings wherein like numbers of reference refer to similar parts throughout:

FIG. 1 is a partial orthographic top view of a somewhat idealized bale chamber showing my invention in place thereon.

FIG. 2 is a vertical orthographic end view of the device of FIG. 1, showing the various parts, their configuration and relationship from this aspect.

FIG. 3 is a semi-diagrammatic illustration of the operation of my invention showing in FIG. 3a the invention in contracted condition with greatest pressure between the pressure plates and in FIG. 3b the invention in most expanded condition with no pressure between the pressure plates.

DESCRIPTION OF PREFERRED EMBODIMENT

Referring now to the drawings in more detail and particularly to that of FIG. 1, there will be seen a baling chamber of the type common in many commercial baling devices. The baling chamber, designated generally as 10, is formed with vertically extending sheet-like sides 11 having substantially perpendicularly disposed, horizontally extending, upper lips 12 and lower lips 13. Paired opposed upper pressure plate 14 and lower pressure plate 15 are pivotally mounted in the forward portion of this chamber upon axle 16 communicating with bale chamber 10 by bracket 17. This mounting is such as to allow pressure plates 14, 15 to pivotably move somewhat within, and parallel to, planes joining the paired opposed lips 12, 13.

Hay is baled in such a chamber by forcing the loose hay collected by other portions of the baling machine (not shown) by a piston device (not shown) into the forward portion 10a of the baling chamber, where it is restrained by the chamber walls. Frictional passage of matter through the bale chamber is regulated by the paired opposed pressure plates. Well known auxiliary tieing structures (not shown) are provided to cooperate with the device to tie the compressed hay bales to form the unitary bale structures of commerce.

My invention comprises the pressure equalizing structure, designated generally as 18, mechanically communicating between upper and lower pressure plates to regulate and determine the force exerted therebetween.

A U-shaped bell-crank bracket having horizontal body 19 structurally communicating with and extending transversly of upper pressure plate 14 with lateral perpendicularly extending bell-crank journaling arms 20 pivotably journals bell-crank rod 21. This bell-crank bracket is preferably provided in the rearward portion of the upper pressure plate to create some lever arm for application of vertical force thereon. The horizontal body 19 will, obviously, limit the downward extension of the upper pressure plate by reason of communication with the upper lips 12 of sides 11. This bracket may be conveniently attached by bolting 42.

Bell-crank rod 21 provides a pivotably axis through its straight parallel end portions 22 and has a U-shaped central portion 23 communicating therebetween to accomodate spring arm 24 and allow a null positioning thereof as hereinafter specified. The bell-crank rod is preferably formed from cylindrical steel and is pivotably journaled in arms 20 by simple bearing 25.

Spring arm 24 is, for ease of attachment, a U-shaped channel as illustrated in FIG. 1, structurally communicating with central part 23 of bell-crank rod 21 in such position that it will extend substantially vertically when the bell-crank rod extends with central portion 23 in a substantially horizontal plane. In its upper portion spring arm 24 carries spring bolt 26, extending laterally between its arms, and held in this position by cooperating nuts 27. Springs 28, preferably plural, communicate from spring bolt 26 to forward spring yoke 29 carried by spring positioning bolt 30, adjustably positionable relative spring bolt bracket 31 by threaded adjustment of nut 32 on the threaded end portion thereof. The spring bolt bracket 31 is structurally carried by the forward portion of upper pressure plate 14, again preferably by bolting.

Similar paired opposed bell-crank pressure arms 33 irrotatably communicate with the end portions 22 of bell-crank 21 laterally of journaling arms 20. These arms are angularly positioned relative the plane through bell-crank end portions 22 and U-shaped central portion 23 to form an angle of approximately seventy degrees. Plural spaced holes 34 are provided in the bell-crank pressure arms to adjustably receive pressure plate arms 35.

These pressure plate arms 35 are paired opposed similar structures of somewhat ogive shape, such as illustrated in FIG. 3, to place the point of their communication with lower pressure plate 15 substantially vertically below the axis of pivot of bellcrank 21. The uppermost portion 36 of each pressure arm carries auxiliary yoke element 37 adapted to cooperate with the pressure arm to form a yoke with appropriate holes to pivotably receive cooperating bolt-nut structure 38 to pivotably communicate between the pressure plate arm and bell-crank pressure arm 33. The lower portion of pressure arms 35 have perpendicularly projecting fastening brackets 39 provided with appropriate holes to receive bolt-nut combinations 40 communicating with lower cross-member 41 extending therebetween. This lower cross-member 41 structurally communicates with the under-surface of lower pressure plate 15, substantially vertically below the pivotable axle of bell-crank 21, and nut-bolt combination 40 provides means for lineal adjustment between the members, to a limited degree.

From the foregoing description of the structure of my invention, its operation can now be understood.

Hay is presented to forward portion 10a of baling chamber 10 by a forcible piston action of other portions of the baler (not shown) and this hay is compacted, into a unit of the external configuration of the bale, during its passage through the baling chamber. The passage of the bale through the chamber is restricted by sliding frictional engagement with pressure plates 14, 15 and this frictional restriction of passage determines the compaction and ultimate density of the bale produced therein. The hay in the baling chamber is separated into discreet units of normal bale length and appropriately tied by structures (not shown) not necessarily related to my invention.

Since the nature of frictional contact between matter being baled and inner contacting surface of pressure plates 14, 15 varies with the condition of material, it is necessary to regulate the relative pressure between the plates; and since this condition varies quite continuously during field operations it is necessary to provide such regulation automatically or continuously. The instant invention provides a functionally decreasing pressure between plates 14, 15 upon their expansion, with a maximum pressure at their innermost point as illustrated particularly in the diagram FIG. 3a. With this condition the bell-crank will cause the pressure plates to be contracted and there will exist the greatest vertical component of pressure between the plates. As the plates expand away from each other spring arm 24 of the bell-crank will move clockwise or rearwardly and the angle through which force is applied on bell-crank 21 will become less so that the vertical component of this force, or the force existing between upper and lower pressure plates 14, 15, will correspondingly become less.

The essence of my invention resides in the fact that this structure allows such clockwise motion of bell-crank 21 as will allow springs 28 to be essentially horizontal, with the axis of the bell-crank coincident with the line of action of spring 28. In this condition there will be no vertical component of force caused by the springs on the pressure arms and there will be substantially no force existing between the pressure plates 14, 15 to urge them toward each other.

It has been found in actual practice that this latter condition is necessary in a hay baler pressure plate equalizer of this type to effectively deal with extremely wet hay, as if there be any pressure whatsoever between pressure plates 14, 15 hay may plug within the bale chamber.

There is no particular purpose in allowing the structure to go past the point immediately heretofore described as friction on the upper and lower portions of the bale is still maintained by upper and lower lips 12, 13 and by the forwardmost pivot point of the pressure plates, with little function if any of the rearward portion of these plates.

It is to be noted that as aforesaid it is known in the existing art to provide mechanical means causing decreasing force urging the pressure plates toward each other as the plates expand away from each other. It is to be noted, however, that these known means do not provide a condition of no force urging the pressure plates toward each other at their outermost limits of expansion as does the instant device.

While the foregoing description is necessarily of a detailed and particular character so that a specific embodiment of my invention may be set forth as required, it is to be understood that various rearrangement of parts, multiplications thereof and modifications of detail may be made in connection with the invention without departing from its spirit, scope or essence.

Having thusly described my invention, what I desire to protect by Letters Patent, and

What I claim is:

1. In a commercial hay baler of the type having a forward structure with baling chamber providing a rearwardly extending baling channel with upper and lower pressure plates pivotably carried therein to regulate the density of bales passing therethrough, a spring tensioning means comprising, in combination:

an adjustable bell-crank having a spring arm and at least one pressure arm, the spring arm being mounted in a U-shaped protuberance in the central portion of the bell-crank rod so that a tensioning spring may communicate therewith rearward of the pivotable axis thereof, said pressure arm being angularly positioned to the plane of said bell-crank rod at approximately seventy degrees and all of said bell-crank arms having a plurality of axially spaced holes at varying radial distances from said bell-crank;

a bracket in the rearward portion of said upper pressure plate mounting said bell-crank structure for pivotable motion;

at least one elongate tensioning spring communicating from the forward structure of said baler to one of the plurality of holes in said spring arm; and a lower pressure yoke pivotably communicating from the plural holes in said pressure bar arm through pressure arms to a lower cross-member communicating with the lower rearward portion of the lower pressure plate.

References Cited

UNITED STATES PATENTS

| | | | |
|---|---|---|---|
| 2,551,464 | 5/1951 | Raney | 100—192 |
| 3,356,017 | 12/1967 | Westerman | 100—192 |

FOREIGN PATENTS

| | | |
|---|---|---|
| 584,325 | 9/1933 | Germany. |
| 1,028,375 | 4/1958 | Germany. |
| 818,890 | 8/1959 | Great Britain. |

PETER FELDMAN, Primary Examiner